Dec. 20, 1949

W. DILLEY 2,491,957

INDUSTRIAL SAFETY SHIELD

Filed June 7, 1945

INVENTOR.
WILLIAM DILLEY
BY John H Leonard
ATTORNEY

Patented Dec. 20, 1949

2,491,957

UNITED STATES PATENT OFFICE 2,491,957

INDUSTRIAL SAFETY SHIELD

William Dilley, Cleveland, Ohio

Application June 7, 1945, Serial No. 598,123

2 Claims. (Cl. 160—351)

This application is a continuation-in-part of my copending application Serial No. 555,457, filed September 23, 1944, which matured into U. S. Patent No. 2,401,056 issued May 28, 1946.

The copending application shows and claims an industrial safety shield having permanently magnetic means associated therewith whereby the shield, which is preferably transparent or translucent plastic, can be moved easily and quickly from one position to another on a machine tool, or supporting structure, with respect to the work being performed thereby or thereon so as to guard the operator from flying chips, sparks, splashing liquid, radiant energy and the like. As illustrative examples but not limitations of the uses of the present invention it is particularly effective for use in connection with grinding wheels or other high speed rotary or reciprocating equipment, welding outfits in connection with which it may be attached to the welding outfit or on a support on which the work being welded is retained in proper position, chemical experiments in which there is danger of splashing or scattering of ingredients due to chemical reactions, and in fact in a large number of miscellaneous instances in which it is desirable to protect the operator by rather closely confining the sparks, chips, liquids and the like which are apt to harm the operator if he is not adequately protected.

The magnetic means is also so arranged that at least two magnetic poles on each shield are applicable for support of the shield to ferrous parts of the machine tool or apparatus in different positions of said poles and said magnetic means is also arranged to be movably mounted on the shield.

This application relates principally to a hood type of shield and preferably one which is flexible and has permanently magnetic means associated therewith at opposite edges, each movable with respect to a supporting surface independently of the cooperating magnetic means.

More specifically it relates to a specific means for attachment of a magnet to a transparent or translucent shield arrangement which is not specifically claimed in my said copending application; to a double shield arrangement for machine tools and the like whereby the main shielding surface may be protected from contact with flying chips, oil splash and the like; and a hood type of shield provided with means for salvaging chips and granules of material such as precious metal being worked on by the machine tool with which the shield is associated.

Figure 1:
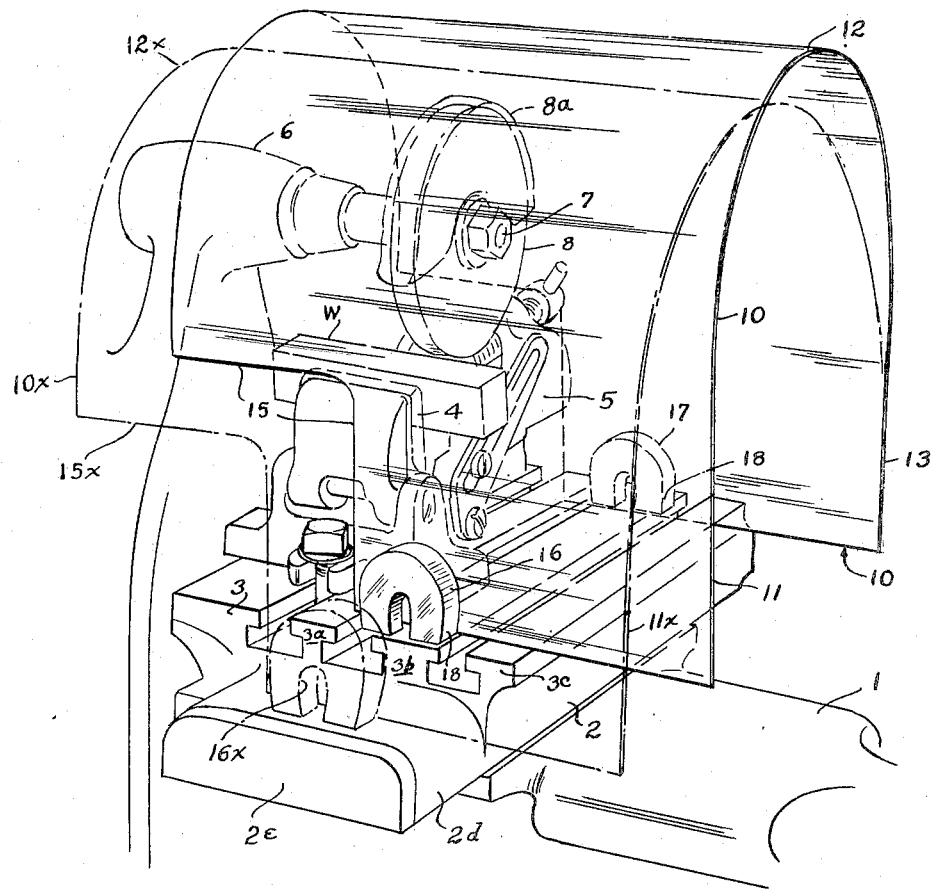
Figure 2:
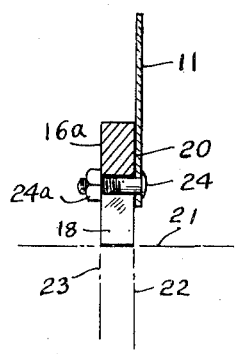

These and other objects, including those set forth in my copending application, will become apparent from the following description wherein reference is made to the drawings, in which Fig. 1 is a perspective view showing one form of shield attached to a grinder, the latter being partially shown;

Fig. 2 is a fragmentary view showing one manner of attachment of a permanent magnet to the shield material such as transparent plastic of sheet form.

Referring first to the arrangement shown in Fig. 1, the machine tool on which a form of the shield apparatus hereof is mounted is a grinder having a bed 1 which may be movably supported on the main frame, not shown, and a cross slide 2 which carries the work, the specific showing representing the slide 2 as carrying on the usual top rails 3, 3a, 3b and 3c a gripping device in the form of cooperating vise jaw mechanisms 4 and 5 for the work. An arbor is indicated at 6 carrying a supporting spindle 7 having a grinding wheel 8 or other rotary cutter. The usual metal wheel guard 8a is suitably supported in partially surrounding relation to the wheel to protect the workman from being struck by fragments of the wheel in the event of breakage of the wheel. The vise jaw mechanisms are shown as supporting a work piece W in the form of a metal block for presentation to the wheel 8. The cross slide 2 in addition to the top rails 3, 3a, etc., has a forward extension 2d which, in the particular form illustrated, lies somewhat below the top faces of the rails.

The shield 10 is in the form of a hood comprising preferably a single sheet of transparent plastic material which may be, for instance, fairly light gauge transparent acrylic resin. The shield 10 as shown has a forward panel portion 11, arched top portion 12 and a rear panel portion 13. The portions mentioned preferably curve gradually one into another to minimize image distortion by light refraction and to minimize reflection points or lines such as would be present in case the arch comprised a series of flat face portions of the sheet.

The forward panel portion 11 of the shield is cut away as at 15 whatever amount may be necessary in order to clear the vise which may be affixed to the work slide in various positions and turned at various angles. The open end of the shield opposite the cut away portion enables the operator to reach into the operating zone the required distance for mounting and dismounting of the work.

At the lower edges of both the front and rear panel portions of the shield and at any desired position along either edge, permanent magnets 16 and 17, respectively, are mounted, presenting double pole face portions 18 downwardly and in other directions for supporting attachment of the shield against the upper faces of the rails 3, 3a, etc. and against any generally vertically extending surfaces of the machine. Thus either magnet may be applied to the end surfaces of the rails as well as to the top surfaces and in this connection it may be noted that the magnets do not have to be applied directly to the supporting surfaces since the shield, particularly if of fairly light gauge sheets stock, may be interposed between the pole portions 18 and the ferrous surface or surfaces which support the shield through the intermediary of the magnets. If, due to peculiarities of the machine, the magnets have to engage vertical supporting surfaces on the machine then the magnets are preferably mounted on the inside faces of the shield. The mounting can be detachable and reversible for inside or outside positions of the magnets as desired. As illustrated in Fig. 2, the poles 18 may project below the lower edge of either forward or rearward panel portions of the shield for direct attachment of the magnet poles with such vertically disposed surface as exemplified by the surface 2e, Fig. 1.

The flexibility of the shield stock enables the shield to be flexed and magnetically anchored, thus affording an infinite array of positions from which to select one best protecting the eyes and other body parts of the operator, best for affording a clear view of the work being done and best for conforming to peculiarities of work and tool mechanism. As illustrated by broken lines in Fig. 1 the magnet 16, the broken line position of which is indicated at 16x, is shown as having been moved from the full line illustrated position on one of the top supporting rails to a position of attachment at the top face of the portion 2d of the cross slide 2. Movement of the magnet 16 from one position to another does not disturb the attached position of the magnet 17. The flexing of the shield by the repositioning of the magnet 16, as indicated by the broken line position 16x of the shield, has lowered the upper arch portion to the position 12x, thus more closely surrounding the grinding wheel, and has moved the horizontal edge of the cut away portion 15 to the position 15x wherein additional surface portions of the forward panel of the shield are protectively interposed between the operator and the work. Still greater advantage in that respect can be afforded if the magnet 16 is further lowered as by operatively associating the poles 18 with the end surface portion 2e of the cross slide 2.

One manner of attachment of the magnets to the shield is illustrated in Fig. 2 wherein the magnet 16a is shown attached to the lower edge of the panel portion 11 directly by an adhesive film 20. A suitable adhesive is now available on the market under the name "Testor's crystal clear cement." As shown in Fig. 2, the magnet pole portions 18 extend below the lower edge of the shield so as to be available for direct application to ferrous supporting surfaces in intersecting or parallel relationship as at 21, 22 or 23. As also shown by Fig. 1a the magnets may be held against the plastic panel by additional fastening means such as a bolt 24 with a suitable nut 24a with the object of applying sufficient pressure to the adhesively secured surfaces to hold the surfaces against misalignment until the adhesive has set. The adhesive mentioned above does not require any assistance from the bolt after the cement has set and the bolt may then either be removed or left in place as desired.

Precast acrylic resin sheets of suitable gauge to make such a shield as shown by Fig. 1 are preferably fabricated by heating the sheets to soften them and then molding the sheet material by hand or over a mandrel or between cooperating dies into the arched form. When cooled the original flexibility returns naturally to the sheet material so that one end of the shield can be magnetically secured to a ferrous surface in the desired position by its magnet or set of magnets and the other end of the shield can then be selectively secured in various desired positions on ferrous surfaces adapted to receive the magnet or set of magnets at such other end of the shield. The shield material, even up to $\frac{3}{16}''$ in thickness in sufficiently large sized sheets for adaptation to machine tools such as shown, has enough flexibility to enable adjustment of the magnet or magnets at one end or panel of the shield independently of the magnet or magnets at the opposite end or panel.

I claim:
1. An industrial safety shield comprising a resiliently flexible shield of plastic material and a plurality of separate permanently magnetic means secured thereto in spaced relation to each other, said magnetic means having pole faces of opposite polarity exposed for contact with a support and said magnetic means being operative, when engaged with the support, to hold the shield in flexed condition against its self-restoring force, whereby the shield can be anchored magnetically to a ferrous surface at one portion of the shield and the remainder of the shield flexed to the desired position and anchored magnetically at said other portion of the shield while the shield is flexed to said desired position.

2. An industrial safety shield comprising a resiliently flexible shield of plastic material and a plurality of separate permanently magnetic means having pole faces positioned relative to the shield for magnetic cooperation with a ferrous support, and said magnetic means being operative when in magnetic cooperation with the support to hold the shield in flexed condition against its self-restoring force, the spacing of said permanently magnetic means being a sufficient distance from each other so that the shield can be anchored magnetically to a ferrous support at one portion of the shield and the remainder of the shield flexed between the magnetic means and anchored magnetically at another portion while the shield is so flexed.

WILLIAM DILLEY.

REFERENCES CITED

The following references are of record in the file of this patent:

UNITED STATES PATENTS

| Number | Name | Date |
| --- | --- | --- |
| 1,232,953 | Mills | July 10, 1917 |
| 2,193,469 | Ashton | Mar. 12, 1940 |
| 2,401,056 | Dilley | May 28, 1946 |